Figure 1:
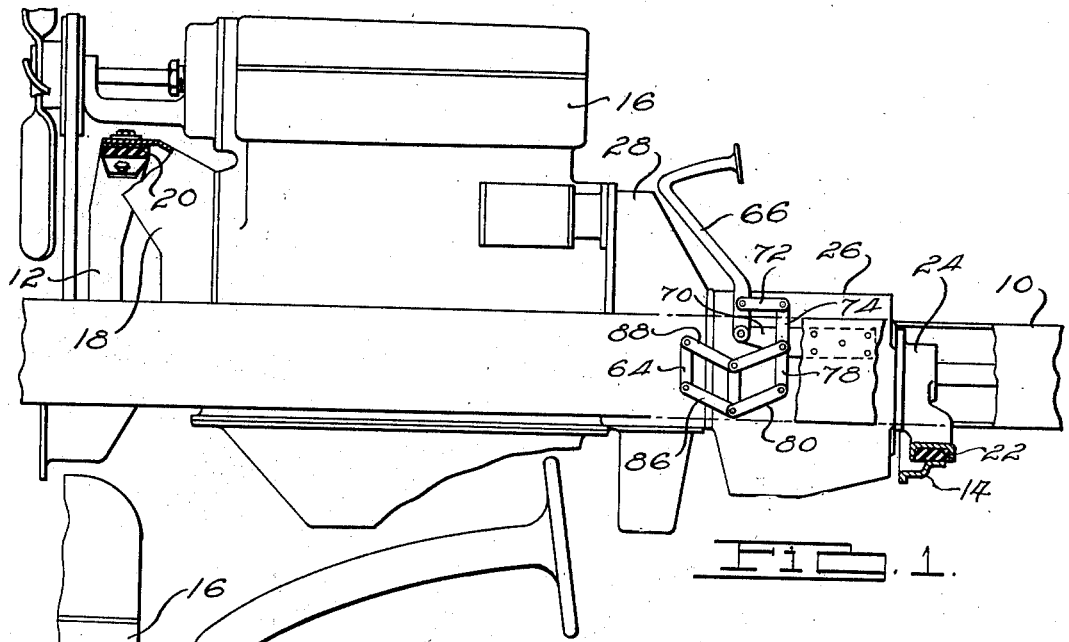

April 10, 1934.　　　L. ZIMMERMANN　　　1,954,234
CLUTCH CONTROL MECHANISM
Filed Jan. 17, 1933　　　2 Sheets-Sheet 1

INVENTOR.
LUKAS ZIMMERMANN.
BY
ATTORNEYS.

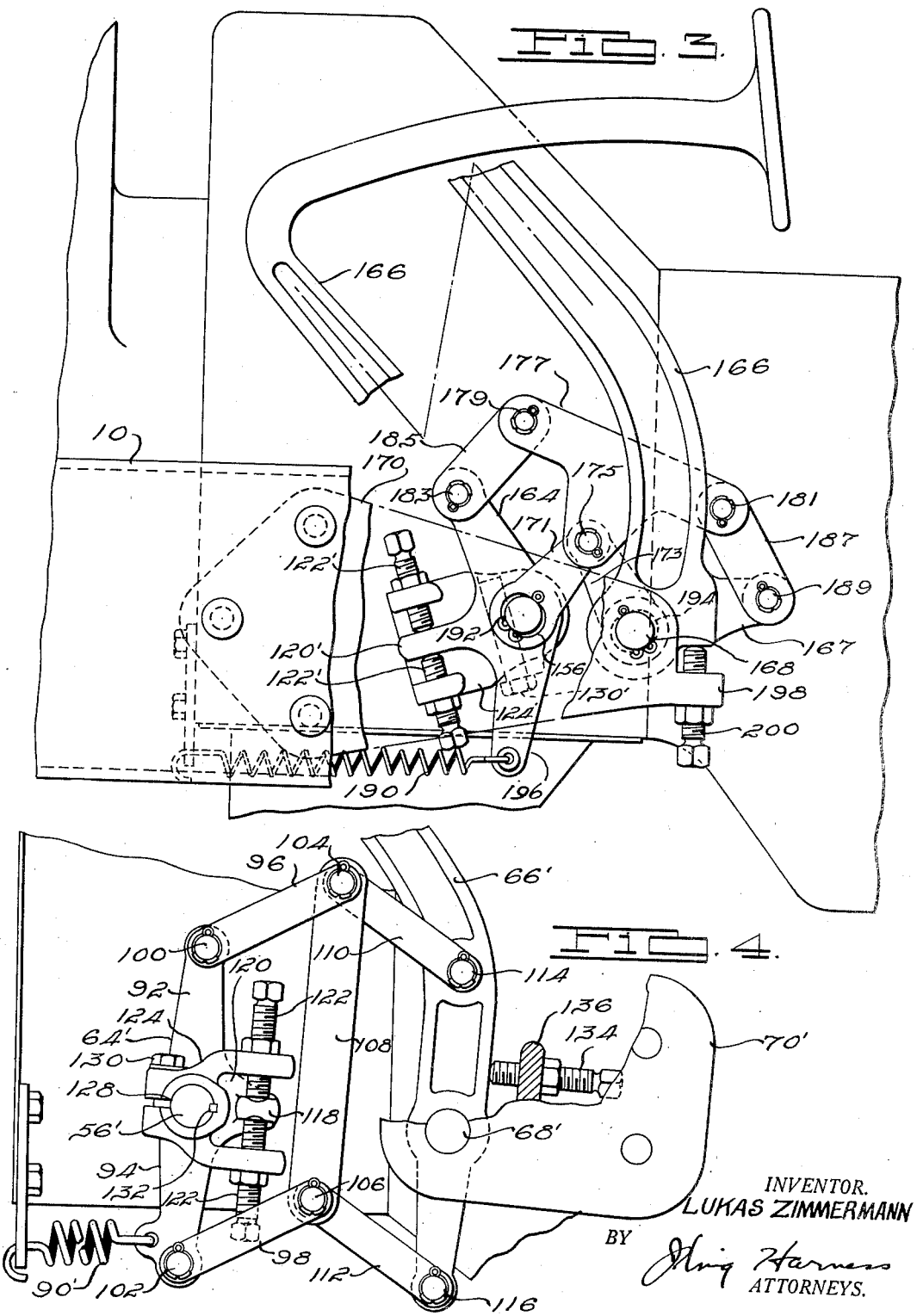

Patented Apr. 10, 1934

1,954,234

UNITED STATES PATENT OFFICE 1,954,234

CLUTCH CONTROL MECHANISM

Lukas Zimmermann, Detroit, Mich., assignor to Chrysler Corporation, Detroit, Mich., a corporation of Delaware Application January 17, 1933, Serial No. 652,191

13 Claims. (Cl. 180—64)

This invention relates to automotive vehicles and more especially to clutch control mechanism therefor.

In present day practice, the engine of an automobile is yieldably mounted in the frame of the vehicle so as to have considerable movement relative to the frame. This movement of the engine may result from a number of causes, such as, the torsional effort of the engine or resistance of the engine to torsional effort of the drive line, operation of the clutch, the inertia of the engine as the vehicle is subjected to road shocks or a change of direction, and to acceleration and retardation of the vehicle. Thus the engine is permitted rotational, horizontal and vertical movements and combinations of such movements relative to the vehicle frame. The clutch control pedal may be pivoted either to the clutch housing fixed to the engine or to the frame of the vehicle, the latter being the usual arrangement employed. Accordingly, when the clutch control shaft and pedal operated members are connected by linkage on only one side of the axis of the shaft, depression of the clutch pedal urges the engine longitudinally and places the yieldable mountings under compression. Then, when the engine tilts transversely under the influence of the torque reaction created during engagement of the clutch, the pressure directed longitudinally upon the engine by the linkage is relieved and the resilient or yieldable mountings urge the engine longitudinally in an opposite direction causing rotation of the clutch control shaft in a direction which suddenly brings the clutch elements again into engaged condition. Repeated oscillation of the engine while the clutch is subjected to foot pressure, causes rapid engagement and disengagement of the clutch which promotes severe chattering of the clutch and vibration of the clutch pedal. Also the linkage causes the clutch pedal to rotate as the engine moves, such movement being transmitted from the engine through the clutch and the clutch control mechanism to the clutch pedal, causing undesirable vibration of the pedal and also causing variations in the action of the clutch control mechanism and clutch. As a result, glazing and excessive wear of the faces of the clutch discs will occur and there will be excessive wear at the pivots and bearing of the elements of the clutch control mechanism. The main object of this invention is to obviate the above difficulties.

Another object is to provide a clutch control mechanism including a control lever pivoted to a vehicle frame and a control lever pivoted to a clutch housing, which mechanism transmits no movement except rotation from the pivot of one lever to the pivot of the other lever and which transmits equal rotative movement from one lever to the other regardless of the relative positions of the pivots of the levers and regardless of relative movements of such pivots in any direction.

A further object of the invention is to provide a clutch control mechanism which allows movement of the engine relative to the frame without causing movement or vibration of the clutch pedal and without causing variation of the control of the clutch.

A further object of the invention is to avoid, in the above construction, dead travel of the clutch pedal.

Another object is to increase the effective length of the pedal stroke.

A further object is to lower the required pedal pressure.

Other objects and advantages will become apparent from the following description and appended claims, taken in connection with the accompanying drawings wherein are depicted various embodiments of clutch control mechanism constructed and arranged in accordance with the principles of this invention.

Figure 2:
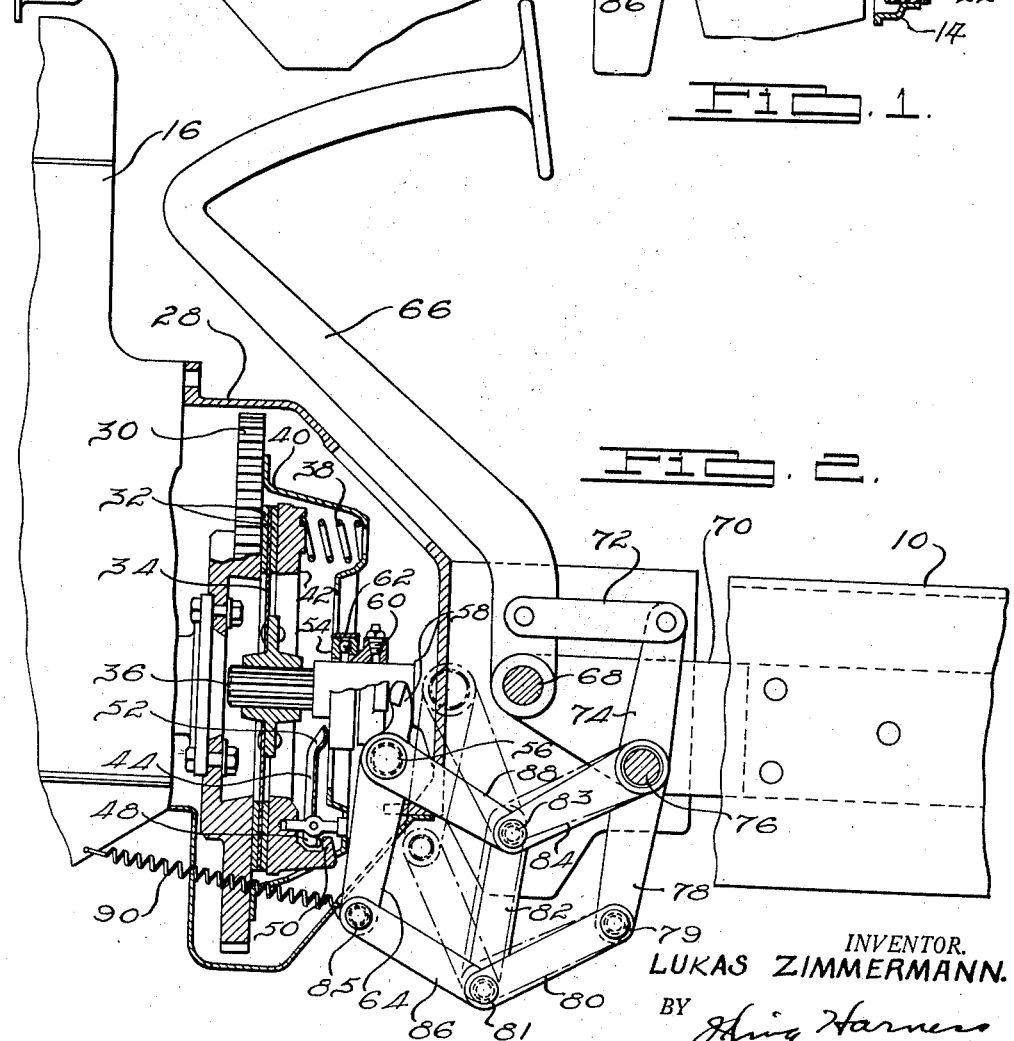

In the drawings:

Figure 1 is a side elevation of a portion of the chassis of an automobile with parts broken away and in section to illustrate an arrangement of engine, clutch, and clutch control mechanism in accordance with this invention, Fig. 2 is an enlarged side elevation with parts in section of clutch control mechanism shown in Fig. 1, Figs. 3 and 4 are views similar to Fig. 2 of other embodiments of clutch control mechanism according to the present invention.

Referring to the drawings and more particularly to Figs. 1 and 2, a form of clutch control mechanism is illustrated in conjunction with a power unit of a vehicle which includes a rigid frame structure 10 having transverse support members 12 and 14, respectively, on which the front and rear ends of an internal combustion engine 16 are supported. The front end of engine 16 is supported at the approximate center of transverse member 12 by means of a bracket 18 secured to the crank case of engine 16, a yieldable cushion 20, preferably of rubber, being interposed between the bracket 18 and the central portion of the transverse member 12 of the frame structure. The rear end of the engine is yieldably supported by a rubber cushion 22 interposed between the central portion of transverse member 14 and a bracket 24 secured to the transmission casing 26. The cushions 20 and 22 provide resilient mountings which permit rotational, horizontal, and vertical movements of engine 16, as well as combinations of the above movements.

Interposed between the engine 16 and transmission casing 26 and securely fastened to both, is a clutch unit which includes a housing 28 in which the fly wheel 30 of the engine is received. The clutch includes a pair of friction elements 32 mounted at the sides of a disc 34 which is splined and shiftably mounted on the transmission shaft 36. The disc 34 and friction elements 32 are normally urged with substantial pressure toward the fly wheel 30 by springs 38 which bear between a housing 40 that is carried by the fly wheel and a pressure ring 42 engageable with one of the friction elements 32. Thus, the springs 38, through the intermediary of ring 42 normally retains the frictional clutch elements 32 in engaged relation with the disc 34.

The clutch is provided with clutch disengaging mechanism for retracting the ring 42 against the action of springs 18 and for releasing the frictional interconnection between the fly wheel 30 and disc 34. This mechanism preferably includes a plurality of levers 44 which are pivotally mounted intermediate their ends at 46 on the housing 40. The levers 44 are radially directed relative to the transmission shaft 36 and the outwardly directed arm 48 of each lever engages a lug 50 formed integrally with the ring 42 and the inwardly directed arm 52 of each of the levers engages a collar 54 which is slidably mounted on the transmission shaft 36.

A clutch control shaft 56 is journaled in the clutch housing 28 at a level below transmission shaft 36 and extends transversely with respect to the transmission shaft. A clutch release arm 58 is fixed to the clutch control shaft 56 and is positioned to operate a sleeve 60 which in turn, through the intermediary of a bearing 62, acts to shift the collar 54 against the inner ends 52 of levers 44. The collar 54 forms one race of the bearing 62. When the clutch release arm 58 is rotated in a counter-clockwise direction as viewed in Fig. 2, the collar 54 is moved forwardly and the levers 44 are rotated also in a counter-clockwise direction so as to move the ring 42 rearwardly against the action of springs 38, thus disengaging the clutch. A clutch operating lever 64 is fixed against rotation on the external end of shaft 56. To effect a release of the clutch, a clutch pedal 66 is pivotally connected at 68 to a bracket 70 fixed to frame 10. In providing an operative connection between the clutch pedal 66 and the clutch release arm 58, it is desirable that only rotative effort be imparted to the clutch control shaft 56 and also that the operative connection be such that any movement of the clutch control shaft 56 other than rotation will not cause rotation or vibration of the clutch pedal 66. To this end the clutch pedal 66 is connected by means of a link 72 to an operating lever 74. The operating lever 74 is centrally pivoted at 76 to the bracket 70. One arm 78 of lever 74 constitutes one side of a parallelogram linkage which also includes links 80, 82 and 84. The arm 78 of operating lever 74 and links 80, 82 and 84 of the parallelogram linkage are interconnected by means of pivots 79, 81, 83 and 76. A second parallelogram linkage is provided comprising the lever 64 which operates the clutch control shaft 56, and links 86 and 88 pivoted at their forward ends to the lever 64 and at their rearward ends to the link 82 of the first-mentioned linkage. The link 82 constitutes one link of both parallelogram linkages. The links 64, 86, 82 and 88 of the second parallelogram linkage are interconnected by means of pivots 85, 81, 83 and 56. It will be noted that the pivot 56 of the second parallelogram linkage is fixed relative to the clutch housing and, therefore, with respect to the engine of the vehicle and that the pivot 76 of the first mentioned linkage is pivoted to the bracket 70 and, therefore, fixed relative to the frame of the vehicle. The links 80, 84, 88 and 86 of the two parallelogram linkages are made substantially of the same lengths. Also, the links 78, 82 and 64 are made of essentially equal lengths. In Fig. 2 the clutch pedal 66 is shown in retracted position and the clutch in engaged condition. To release the clutch, the clutch pedal 66 is rotated in a counter-clockwise direction and, through the link 72, causes counter-clockwise rotation of the operating lever 74 which in turn causes counter-clockwise rotation of the link 82 and lever 64 about the pivots 83 and 56, respectively. In this operation the arm 78 of lever 74, the links 80 and 86, and lever 64 are placed under tension and the links 80 and 86 in turn place the links 82, 84 and 88 under compression. Since the resultant of the forces exerted by link 88 under compression and lever 64 under tension upon the pivot 56 will be a force extending forwardly and downwardly, and the resultant of the forces exerted by lever 64 and link 86 both under tension will be a force directed upwardly and rearwardly, and since the angle formed by lever 64 and link 86 will always be supplemental to the angle formed by lever 64 and link 88, these resultant forces will always be opposite and equal and thus constitute a couple tending to rotate the lever 64 about shaft 56 as a pivot. Thus rotation of the clutch pedal 66 will cause only a rotational force to be applied to the clutch control shaft 56 and no forces tending to shift the shaft 56 will be exerted upon rotation of the clutch pedal. It will also be noted that the position of the shaft 56 relative to that of the pivot 76 is immaterial. If the links 80, 82, 84, 88, 86 and 64 and the pivots thereof are in the positions indicated by dot-and-dash line in Fig. 2, it will be noted that rotation of the clutch pedal 66 will exert only a rotative force upon the clutch control shaft 56 in the same manner as previously explained. Therefore, with the engine mounted upon yieldable supports so that the clutch control shaft 56 is free to shift its position, the movement other than rotation of clutch control shaft 56 will exert no forces back through the parallelogram linkages tending to rotate the clutch pedal 66. Thus, regardless of the relative positions of and relative movements of the shafts 56 and 76, rotation of one of the levers 64 or 74 will cause equal rotation of the other lever, but any movements in any direction of either lever other than rotation about its pivot cannot cause any kind of movement of the other lever.

It is also desirable that the means for interconnecting the clutch pedal 66 and the operating lever 64 or the clutch release arm 58 is so designed that it offers no resistance to the transverse tilting of the engine under the influence of the torque reaction created during operation of the engine with the clutch engaged. To this end the links 80, 82, 84, 86 and 88 are provided with openings slightly larger than the pivot members 79, 81, 83, 76, 85 and 56. Thus, a certain amount of looseness at the pivotal connection of the linkages permits free tilting movement of the engine to take place without opposition from the interconnecting means between the clutch pedal and the clutch operating shaft 56. A spring 90 is disposed in tensioned position between a point adjacent the end of operating lever 64 and a fixed point forwardly thereof to take up the looseness in the pivotal connection and to retract the clutch pedal. The spring 90 not only takes up the looseness in the pivotal connections of the linkages to prevent rattling, but also takes up this looseness in such a way that upon the initiation of the depression of clutch pedal 66 no dead travel of the clutch pedal is required to take up the play in the pivotal connections of the linkages. The spring 90 places links 80 and 86 under tension and links 82, 84 and 88 under compression in the same manner as does the depression of the clutch pedal so that upon the initiation of the depression of the clutch pedal the clutch release arm 58 will be rotated immediately.

For smooth operation of a clutch upon engagement and disengagement, it is desirable to provide a relatively long stroke of the clutch pedal relative to the movement of the ring 42. This is effected by the ratio of the length of the arms of levers 44 and by the ratio of the length of the clutch pedal 66 to that of the clutch release arm 58. The ratio of clutch pedal travel to the travel of ring 42 is further increased by connecting the link 72 to clutch pedal lever 66 at a lesser distance from the pivot 68 than the distance from pivot 76 to the pivotal connection between lever 74 and link 72. This increases the effective pedal stroke and decreases the required pedal pressure.

Referring particularly to Fig. 4 of the drawings, another embodiment of the invention will be described. In this form of clutch control mechanism, a clutch pedal lever 66' is pivoted intermediate its ends at 68' to a bracket 70' fixed to the automobile frame. The clutch control shaft 56' is provided with an operating lever 64' which has oppositely directed arms 92 and 94 of equal lengths. To the ends of arms 92 and 94 are pivoted links 96 and 98 by means of pivot members 100 and 102 disposed at equal distances from the axis of clutch control shaft 56'. The links 96 and 98 are connected by pivot members 104 and 106 to a link 108, these pivotal members being separated by the same distance as that which separates the pivot members 100 and 102. The pivot members 104 and 106 carry links 110 and 112 equal in length to that of the links 96 and 98 and these links are connected to the pedal lever 66' by pivot members 114 and 116 separated the same distance as are the pivot members 104 and 106 of link 108 and pivot members 100 and 102 of clutch operating lever 64'. The pivot members 114 and 116 are disposed on opposite sides of and at equal distances from the axis of pivot member 68'. The levers 64' and 66' together with links 96, 98, 108, 110 and 112 form a pair of parallelogram linkages with link 108 common to each of the linkages. The operating lever 64' of this embodiment is merely journaled upon the clutch control shaft 56' rather than being fixed thereto as in the previous embodiment. A laterally disposed lug 118 projects from an arm 120 which is arranged at an angle with respect to the length of lever 64'. Adjusting screws 122 engage lug 118 and project from the arms of a yoke 124 fixed to clutch control shaft 56' by means of a split collar 128 and bolts 130. A key 132 may also be provided for fixing the collar 124 to shaft 56'.

The clutch control shaft 56' carries a clutch release arm, (not shown), similar to the arm 58 of the previous embodiment. Yoke 124 and the adjusting screws 122 provide means for securing the desired angular adjustment of the operating lever 64' relative to the clutch release arm. A pedal stop in the form of an adjustable screw 134 threaded through a lug 136 fixed relative to the automobile frame may be provided for limiting the retraction of pedal lever 66'. A spring 90' is tensioned between a point adjacent the end of arm 94 of lever 64' and a fixed point on the engine 16 forwardly of lever 64'.

In the operation of this clutch control mechanism, rotation of the pedal lever 66' in a counter-clockwise direction places the links 112, 98 and 108 under tension and the links 96 and 110 under compression. Since that portion of the pedal lever 66' between the pivot members 114 and 116 equal in length the link 108 and lever 64' and since links 96, 98, 110 and 112 are equal in length, the rotation of pedal lever 66' about pivot 68' will cause a corresponding rotation of lever 64'. The rotation of pedal lever 66', as previously pointed out, places the link 96 under compression and link 98 under tension which in turn place both the arms 92 and 94 of lever 64' under compression; therefore, the resultant of forces acting upon pivot member 100 will be forwardly and upwardly, while the resultant of forces acting on pivot 102 will be rearwardly and downwardly, and since the angle formed by arms 92 and 96 will be supplemental to the angle formed by arms 94 and 98, these resultants will be equal and opposite, thus constituting a couple tending to rotate lever arm 64' about the axis of shaft 56' without any tendency to cause a shifting of position of the shaft 56'. Also, as in the previous embodiment, the relative position of the pivot members 56' and 68' is immaterial in so far as the rotation of the lever 64' by the lever 66' is concerned. It is also true, as before, that any shifting of position of either of the shafts 56' or 68' cannot cause any type of movement of the other shaft.

The links 96, 98, 108, 110 and 112 are provided with clearance at the pivots 100, 102, 104, 106, 114 and 116 so that the linkage interconnecting the pedal lever 66' and operating lever 64' will not oppose the transverse tilting of the engine of the automobile. Spring 90' is arranged to take up the clearance at the pivots.

Referring particularly to Fig. 3 of the drawings, an embodiment is disclosed illustrating a clutch control mechanism particularly adaptable in installation wherein, due to other considerations, the clutch control shaft and pivot for the pedal lever must be brought into close proximity, at least too close to each other to provide double linkage mechanism as disclosed in the previous embodiment between such shaft and pivot members. In this embodiment a pedal lever 166 is pivoted at 168 to a bracket 170 fixed to the frame 10 of an automotive vehicle. The clutch pedal lever 166 is provided with an angularly disposed arm 167 extending in a general direction away from the clutch control shaft, designated 156. Journaled upon shaft 156 is a clutch operating lever 164 provided with an angularly disposed arm 120'. An adjusting member 124' corresponding to the yoke member 124 of the previous embodiment, is fixed to the clutch control shaft 156 by suitable means, such as a split collar and tightening bolt 130', and is further provided with laterally disposed lugs through which are threaded adjusting screws 122' in position to engage arm 120'. The clutch control shaft 156 is provided with a clutch release arm (not shown) equivalent to the release arm 58 of the first embodiment and which is fixed to the clutch control shaft. Thus, through the adjusting screws 122' the angularity of such clutch release arm and operating lever 164 may be adjusted. Links 171 and 173 are each connected at one end to the clutch control shaft 156 and the pedal lever pivot 168 and at the other ends are interconnected by a pivot member 175. The links 171 and 173 are preferably of substantially the same length. A lever member 177, which may be in the form of a T-lever, a triangular plate, or in the form of three links, is pivotally connected to pivot member 175 at the end of one leg thereof and pivot members 179 and 181 are disposed at the ends of the remaining legs thereof. Pivot member 179 is connected to a pivot member 183 disposed adjacent the end of clutch operating lever 164 by means of a link 185, the link 185 being equal in length to the length of link 171 and the distance between the axis of shaft 156 and the axis of pivot member 183 being equal to that between the axes of pivot members 175 and 179. Thus, T-lever member 177, lever 164 and links 185 and 171 constitute a parallelogram linkage. The pivot member 181 is connected by a link 187 to a pivot member 189 disposed adjacent the end of arm 167 on pedal lever 166, the link 187 being of the same length as link 173 and the distance between the axes of pivot members 168 and 189 being equal to that between the axes of the pivot members 175 and 181. The T-lever member 177, lever arm 167 and links 173 and 187 constitute a second parallelogram linkage. Since these linkages include a rigid T-lever member 177 or its equivalent which provides one link of each parallelogram linkage, rotation of arm 167 will cause a corresponding rotation of operating lever 164. The rotation of arm 167 in a counter-clockwise direction places the link 187, the portion of T-lever member 177 extending between pivot members 181 and 179, link 185 and operating lever 164 under compression. This rotation of arm 167 also places the links 171 and 173 and the pivot 175 relative to the pivot members 181 and 179 under tension. With the elements in the position shown in Fig. 3 the resultant of forces acting on pivot member 183 will lie in a generally forward direction, while the forces acting on shaft 156 may be represented by a resultant force acting in a generally rearward direction. Since the angles formed between the lever 164 and link 185 and between the lever 164 and link 171 are supplemental, as in the previously described embodiments, these resultant forces will be equal and will act in opposite directions. Thus, rotation of pedal lever 166 will cause only rotational movement of operating lever 164 about the clutch control shaft 156. In this embodiment it is also noted that the relative positions of shaft 156 and pivot member 168 are immaterial. Clearance is provided between the links 171, 173, 177, 185 and 187 and the pivot members 175, 179, 181, 183 and 189. The links 171 and 173 are also provided with clearance at their connections with the shaft 156 and pivot member 168, and preferably the openings are made slightly oval in a direction transverse to the length of the links as indicated at 192 and 194. The clearance provided at the connection of the links with the pivot members of the parallelogram linkages prevents the interconnecting means between the pedal lever and clutch control shaft, from opposing the free tilting movement of the automobile engine in a transverse direction. A spring 190 extends between an arm 196 projected downwardly and integral with the lever 164 and a fixed point on the engine to retract the pedal lever and take up the play at the pivotal connection of the linkages so that upon initiation of movement of the pedal lever, the clutch release arm will be rotated immediately, i e., there will be no dead travel of the pedal lever. It will be noted that the spring 190 places tension or compression upon the same links as does the pedal lever upon being depressed. An adjustable stop member in the form of adjusting screw 200 threaded through a boss 198 in bracket 170 limits the retraction of the pedal lever by spring 190.

As many changes could be made in the above construction and many apparent widely different embodiments of this invention could be made without departing from the scope thereof, it is intended that all matter contained in the above description or shown in the accompanying drawings shall be interpreted as illustrative and not in a limiting sense.

What is claimed is:

1. In an automobile including a frame, an engine movably mounted in said frame and a clutch housing fixed to said engine, a clutch pedal lever pivoted to said frame, a clutch control arm pivoted relative to said clutch housing, and means including a pair of parallelogram linkages interconnecting said clutch pedal lever and said control arm for causing movement of said control arm in proportion to movement of said clutch pedal lever irrespective of movement of said engine relative to said frame.

2. In an automobile including a frame, an engine movably mounted in said frame and a clutch housing fixed to said engine, a clutch operating lever pivoted to said frame, a clutch control arm pivoted relative to said clutch housing, and means including a pair of parallelogram linkages interconnecting said clutch operating lever and said clutch control arm for maintaining said lever and arm in a definite angular relationship irrespective of movement of said engine relative to said frame.

3. In combination, an automobile frame, an engine movably mounted in said frame, a clutch housing fixed to said engine, a clutch pedal lever pivoted to said frame, a clutch control shaft journaled in said clutch housing, and means including a pair of parallelogram linkages for interconnecting said clutch control shaft and said clutch pedal lever, one element of said means providing a side of each parallelogram linkage.

4. In combination with a clutch, control apparatus therefor including a rotatable clutch control shaft, an operating lever fixed to said shaft, a pair of links pivotally connected to the end of said lever, a third link pivotally connected to each of the links of said pair so as to constitute in conjunction with said lever a parallelogram linkage, a second pair of links each pivotally connected at one end to said third link, a second operating lever pivotally connected to each of the links of said second pair so as to constitute in conjunction with said third link another parallelogram linkage, and means for rotating said second operating lever to cause a corresponding rotation of said first operating lever.

5. In combination with a clutch, control apparatus therefor including a rotatable clutch control shaft, an operating lever fixed to said shaft, a pair of links pivotally connected at spaced points to said lever, a third link pivotally connected to each of the links of said pair so as to constitute in conjunction with said operating lever a parallelogram linkage, a second pair of links each pivotally connected at spaced points to said third link, a second operating lever pivotally connected to each link of said second pair so as to constitute in conjunction with said third lever another parallelogram linkage, pedal means for operating said second operating lever to cause a corresponding rotation of said first operating lever, said links being provided with play at the pivotal connection with other links and with said levers, and spring means for taking up the play at such pivotal connections and for retracting said pedal means.

6. In combination, an automobile frame, an engine movably mounted in said frame, a clutch housing fixed to said engine, a clutch pedal lever pivoted to said frame, a clutch control arm pivoted relative to said clutch housing, and a pair of parallelogram linkages for interconnecting said clutch pedal lever and said clutch control arm, one linkage including a lever secured relative to said clutch control arm for even rotation therewith, the other linkage including a lever pivoted to said frame and connected to said clutch pedal lever for rotation at a rate proportional to but less than the rate of rotation of the pedal lever.

7. In combination, an automobile frame, an engine movably mounted in said frame, a clutch housing fixed to said engine, a clutch pedal lever pivoted to said frame, a clutch operating lever pivoted to said clutch housing, and means interconnecting said levers including links constituting in conjunction with said levers a pair of parallelogram linkages for maintaining said levers in parallel relation and transmitting relative movement to said clutch control lever upon rotation of said clutch pedal lever irrespective of the relative position of and relative movement of the pivotal connections of said levers to said frame and to said clutch housing.

8. In combination, an automobile frame, an engine movably mounted in said frame, a clutch housing fixed to said engine, a clutch pedal lever pivoted to said frame, a clutch operating lever pivoted to said clutch housing, means interconnecting said levers including links constituting in conjunction with said levers a pair of parallelogram linkages for maintaining said levers in parallel relation and transmitting rotative movement to said clutch control lever upon rotation of said clutch control lever irrespective of the relative position of and relative movement of the pivotal connections of said levers to said frame and to said clutch housing, a clutch release arm pivoted relative to said clutch housing coaxially with said operating lever, and adjustable means for varying the angular relation of said clutch release arm and said clutch operating lever.

9. In combination, an automobile frame, an engine movably mounted in said frame so as to permit longitudinal movement and transverse tilting of the engine relative to said frame, a clutch housing fixed to said engine, a clutch in said housing, a clutch control shaft journaled in said housing, a clutch pedal lever, pivotal means for connecting said pedal lever to said frame, and means including interconnecting pairs of parallelogram linkages for interconnecting said clutch pedal lever and said clutch control shaft to impart only rotative movement to said clutch control shaft upon rotation of said pedal lever irrespective of the relative position of and relative movement of said clutch control shaft and the pivotal means connecting said pedal lever to said frame.

10. In combination, an automobile frame, an engine movably mounted in said frame, a clutch housing fixed to said frame, a clutch control shaft journaled in said housing, a clutch pedal lever, pivotal means for connecting said pedal lever to said frame, a pair of links pivotally mounted on said clutch control shaft and the pivotal means connecting said pedal lever and frame, pivotal means interconnecting said links, a T-lever pivotally mounted on said last-named pivotal means, an angularly disposed arm on said pedal lever, an operating lever fixed to said clutch control shaft, and a second pair of links pivotally connecting the T-lever to the angularly disposed arm on said pedal and to the operating lever fixed to said clutch control shaft, each of the links of said second-named pair being equal and parallel to one link of the first-named pair.

11. In an automobile including a frame, an engine movably mounted in said frame and a clutch housing fixed to said engine, a clutch control lever pivoted to said frame, a clutch control lever pivoted to said clutch housing, and means including said levers and constituting a pair of parallelogram linkages for transmitting equal rotative movements from one lever to the other but transmitting no movement of any kind to either lever in response to movement other than rotation of the other lever about its pivot.

12. In an automobile including a frame, an engine movably mounted in said frame and a clutch housing fixed to said engine, a clutch control lever pivoted to said frame, a clutch control lever pivoted to said clutch housing, and means including said levers and constituting a pair of parallelogram linkages having a common element for maintaining said levers in a definite angular relationship and for transmitting equal rotative movement from one lever to the other but transmitting no movement of any kind to either lever because of movement other than rotation of the other lever about its pivot.

13. In an automobile including a frame, an engine movably mounted in said frame and a clutch housing fixed to said engine, a clutch control lever pivoted to said clutch housing and a clutch control lever pivoted relative to said frame at a point adjacent the pivotal connection of said first-named lever to said housing, and means including said levers and constituting a pair of parallelogram linkages having a common element for maintaining said levers at an angle to each other and for transmitting equal rotative movement from one lever to the other but transmitting no movement of any kind to either lever because of relative movement other than rotation of the other lever about the pivot of the latter.

LUKAS ZIMMERMANN.